(12) United States Patent
Munguia (10) Patent No.: US 8,560,863 B2
(45) Date of Patent: Oct. 15, 2013

(54) SYSTEMS AND TECHNIQUES FOR DATAPATH SECURITY IN A SYSTEM-ON-A-CHIP DEVICE

(75) Inventor: Peter Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 907 days.

(21) Appl. No.: 11/476,307

(22) Filed: Jun. 28, 2006

(65) Prior Publication Data

US 2008/0005586 A1 Jan. 3, 2008

(51) Int. Cl.
*H04L 29/00* (2006.01)

(52) U.S. Cl.
USPC ............... 713/189; 726/34; 726/9; 713/169; 713/190; 713/194; 380/30; 380/46; 380/264; 380/283

(58) Field of Classification Search
USPC ............ 713/169, 189, 190, 194, 200; 380/30, 380/42–46, 264, 283
See application file for complete search history.

(56) References Cited

U.S. PATENT DOCUMENTS

| 6,118,869 | A * | 9/2000 | Kelem et al. ............... 380/44 |
| 6,351,814 | B1 * | 2/2002 | Batinic et al. ............... 713/194 |
| 7,036,017 | B2 | 4/2006 | Gammel et al. |
| 7,627,291 | B1 * | 12/2009 | James-Roxby et al. ......... 455/73 |
| 7,681,033 | B2 * | 3/2010 | Miura et al. ............... 713/155 |
| 7,694,331 | B2 * | 4/2010 | Vesikivi et al. ............... 726/9 |
| 2002/0095382 | A1 | 7/2002 | Taoka et al. |
| 2002/0166058 | A1 | 11/2002 | Fueki |
| 2003/0179939 | A1 * | 9/2003 | Kim ............... 382/232 |
| 2006/0015753 | A1 * | 1/2006 | Drehmel et al. ............... 713/193 |
| 2006/0059574 | A1 * | 3/2006 | Fayad et al. ............... 726/34 |
| 2006/0059674 | A1 * | 3/2006 | Williams ............... 29/402.08 |

FOREIGN PATENT DOCUMENTS

| EP | 1361511 A1 | 11/2003 |
| FR | 2862150 A1 | 5/2005 |
| JP | 2002-244925 A | 8/2002 |
| JP | 2002-305515 A | 10/2002 |
| WO | 2005/060151 A2 | 6/2005 |
| WO | 2008008623 A2 | 1/2008 |
| WO | 2008008623 A3 | 1/2008 |

OTHER PUBLICATIONS

"International Search Report", PCT/US2007/072204, (Jan. 14, 2008),10 pgs.
First Office Action Mailed Mar. 31, 2010, Chinese Patent Application No. 200780019303.6.
Office Action received for Chinese Patent Application No. 200780019303.6, mailed on Aug. 15, 2011, 5 pages of Office Action including 2 English Translation.

(Continued)

*Primary Examiner* — Jeffrey Pwu
*Assistant Examiner* — Michael D Anderson
(74) *Attorney, Agent, or Firm* — Kacvinsky Daisak PLLC (57) ABSTRACT

Various embodiments for providing datapath security in a system-on-a-chip (SOC) device are described. In one embodiment, an apparatus may comprise a security controller to configure one or more functional units connected to a shared on-chip bus embedded in an SOC device to communicate with other functional units through one or more secure datapaths. The one or more functional units may be arranged to encrypt clear data, send encrypted data out through a secure datapath, receive encrypted data in from a secure datapath, and decrypt the encrypted data to recover clear data. Other embodiments are described and claimed.

23 Claims, 4 Drawing Sheets

(56) References Cited

OTHER PUBLICATIONS

Office Action received for Japanese Patent Application No. 2009-510203, mailed on Mar. 15, 2011, 5 pages of Office.

International Preliminary report received for PCT Patent Application No. PCT/US2007/072204, mailed on Jan. 15, 2009, 6 pages.

International Search report and Written Opinion received for PCT Patent Application No. PCT/US20071072204, mailed on Jan. 14, 2008, 10 pages.

* cited by examiner

SYSTEMS AND TECHNIQUES FOR DATAPATH SECURITY IN A SYSTEM-ON-A-CHIP DEVICE

BACKGROUND

Advancements in semiconductor technology have enabled functional components of a computer or electronic system to be integrated and designed as a system-on-a-chip (SOC) device. In an SOC device, components traditionally manufactured as separate chips such as microprocessors, microcontrollers, data converters, signal processors, memory, and various interfaces, for example, may be embedded into a standalone system on a single chip. The functional units of the SOC device may be designed to communicate internally with each other over an on-chip bus, as well as to communicate with one or more external or off-chip components, such as an off-chip dynamic random access memory (DRAM).

An SOC device may be programmed to perform one or more networking, multimedia, and/or communications applications for personal a computer (PC), consumer electronics (CE), and/or mobile platform. When performing such applications, the SOC device may be required to provide certain security measures in order to protect data against hacking or other unauthorized use in compliance with various regulatory requirements and quality standards. While current security implementations provide tamper-resistant code and other mechanisms to protect data when transferred to and from an external memory, such as an off-chip DRAM, such implementations do not provide on-chip datapath security for an SOC device.

DETAILED DESCRIPTION

Various embodiments for providing datapath security in an SOC device are described. In one embodiment, a security controller may be arranged to configure one or more functional units connected to a shared on-chip bus embedded in an SOC device to communicate with other functional units through one or more secure datapaths. The one or more functional units may be arranged to encrypt clear data, send encrypted data out through a secure datapath, receive encrypted data in from a secure datapath, and decrypt the encrypted data to recover clear data.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Figure 1:
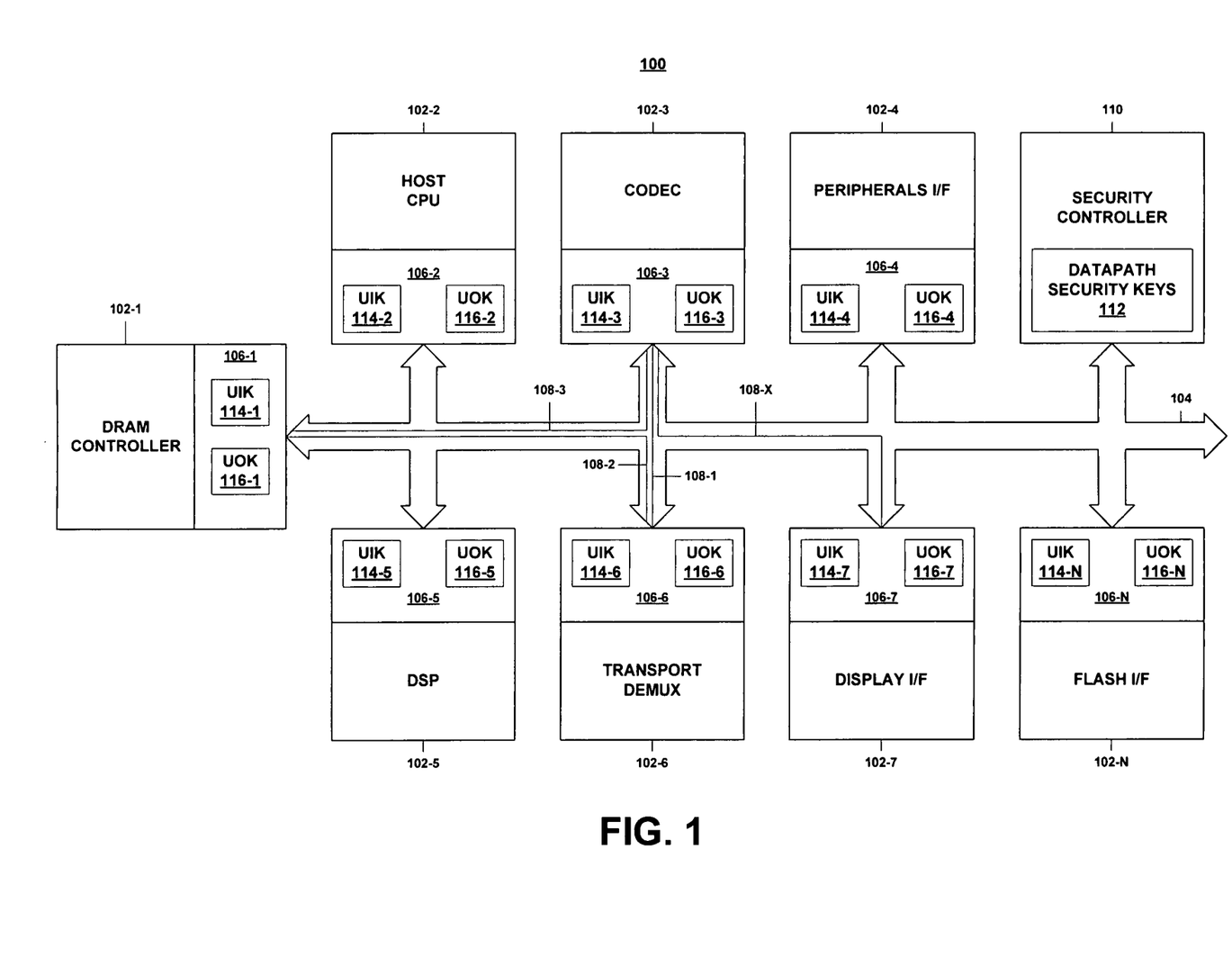
FIG. 1 illustrates one embodiment of an SOC device comprising a security controller to provide datapath security.

FIG. 1 illustrates a block diagram of one embodiment of an SOC device 100. In general, the SOC device 100 may comprise various physical and/or logical components for communicating information which may be implemented as hardware, software, or any combination thereof, as desired for a given set of design parameters or performance constraints. Although FIG. 1 may show a limited number of components by way of example, it can be appreciated that a greater or a fewer number of components may be employed for a given implementation.

In various embodiments, the SOC device 100 may be implemented for a PC, CE, and/or mobile platform as a system within and/or connected to a device such as personal computer (PC), set-top box (STB), television (TV) device, Internet Protocol TV (IPTV) device, media player, and/or smart phone. Other examples of such devices may include, without limitation, a workstation, terminal, server, media appliance, audio/video (A/V) receiver, digital music player, entertainment system; digital TV (DTV) device, high-definition TV (HDTV) device, direct broadcast satellite TV (DBS) device, video on-demand (VOD) device, Web TV device, digital video recorder (DVR) device, digital versatile disc (DVD) device, high-definition DVD (HD-DVD) device, Blu-ray disc (BD) device, video home system (VHS) device, digital VHS device, a digital camera, a gaming console, display device, notebook PC, a laptop computer, portable computer, handheld computer, personal digital assistant (PDA), voice over IP (VoIP) device, cellular telephone, combination cellular telephone/PDA, pager, messaging device, wireless access point (AP), wireless client device, wireless station (STA), base station (BS), subscriber station (SS), mobile subscriber center (MSC), mobile unit, and so forth.

In mobile applications, for example, the SOC device 100 may be implemented within and/or connected to a device comprising one more interfaces and/or components for wireless communication such as one or more transmitters, receivers, transceivers, chipsets, amplifiers, filters, control logic, network interface cards (NICs), antennas, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the SOC device 100 may form part of a wired communications system, a wireless communications system, or a combination of both. For example, the SOC device 100 may be arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The SOC device 100 also may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. Although certain embodiments may be illustrated using a particular communications media by way of example, it may be appreciated that the principles and techniques discussed herein may be implemented using various communication media and accompanying technology.

In various embodiments, the SOC device 100 may be arranged to operate within a network, such as a Wide Area Network (WAN), Local Area Network (LAN), Metropolitan Area Network (MAN), wireless WAN (WWAN), wireless LAN (WLAN), wireless MAN (WMAN), wireless personal area network (WPAN), Worldwide Interoperability for Microwave Access (WiMAX) network, broadband wireless access (BWA) network, the Internet, the World Wide Web, telephone network, radio network, television network, cable network, satellite network such as a direct broadcast satellite (DBS) network, Code Division Multiple Access (CDMA) network, third generation (3G) network such as Wide-band CDMA (WCDMA), fourth generation (4G) network, Time Division Multiple Access (TDMA) network, Extended-TDMA (E-TDMA) cellular radiotelephone network, Global System for Mobile Communications (GSM) network, GSM with General Packet Radio Service (GPRS) systems (GSM/GPRS) network, Synchronous Division Multiple Access (SDMA) network, Time Division Synchronous CDMA (TD-SCDMA) network, Orthogonal Frequency Division Multiplexing (OFDM) network, Orthogonal Frequency Division Multiple Access (OFDMA) network, North American Digital Cellular (NADC) cellular radiotelephone network, Narrowband Advanced Mobile Phone Service (NAMPS) network, Universal Mobile Telephone System (UMTS) network, and/or any other wired or wireless communications network configured to carry data in accordance with the described embodiments.

The SOC device 100 may be arranged to communicate one or more types of information, such as media information and control information. Media information generally may refer to any data representing content meant for a user, such as image information, video information, audio information, A/V information, graphical information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various implementations, the media information and control information may be segmented into a series of packets. Each packet may comprise, for example, a discrete data set having a fixed or varying size represented in terms of bits or bytes. It can be appreciated that the described embodiments are applicable to any type of communication content or format, such as packets, frames, fragments, cells, windows, units, and so forth.

The SOC device 100 may communicate information in accordance with one or more protocols. A protocol may comprise a set of predefined rules or instructions for managing communication among nodes. In various embodiments, for example, the communications system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The SOC device 100 may communicate information in accordance with one or more standards as promulgated by a standards organization, such as the International Telecommunications Union (ITU), the International Organization for Standardization (ISO), the International Electrotechnical Commission (IEC), the Institute of Electrical and Electronics Engineers (IEEE), the Internet Engineering Task Force (IETF), and so forth. In various embodiments, for example, the SOC device 100 may communicate information according to media processing standards such as, for example, the ITU/IEC H.263 standard (Video Coding for Low Bitrate Communication, ITU-T Recommendation H.263v3, published November 2000), the ITU/IEC H.264 standard (Video Coding for Very Low Bit Rate Communication, ITU-T Recommendation H.264, published May 2003), Motion Picture Experts Group (MPEG) standards (e.g., MPEG-1, MPEG-2, MPEG-4), Digital Video Broadcasting (DVB) terrestrial (DVB-T) standards, DVB satellite (DVB-S or -S2) standards, DVB cable (DVB-C) standards, DVB terrestrial for handhelds (DVB-H), National Television System Committee (NTSC) and Phase Alteration by Line (PAL) standards, Advanced Television Systems Committee (ATSC) standards, Society of Motion Picture and Television Engineers (SMPTE) standards such as the SMPTE 421M or VC-1 standard based on Windows Media Video (WMV) version 9, Digital Transmission Content Protection over Internet Protocol (DTCP-IP) standards, High performance radio Local Area Network (HiperLAN) standards, and so forth.

In various embodiments, the SOC device 100 may be arranged to receive media content from a media source. The media source generally may comprise various devices and/or systems capable of delivering static or dynamic media content to the SOC device 100. In one embodiment, for example, the media source may comprise a multimedia server arranged to provide broadcast or streaming media content. In other embodiments, the media source may comprise or form part of a media distribution system (DS) or broadcast system such as an over-the-air (OTA) broadcast system, DVB system, radio broadcast system, satellite broadcast system, and so forth. The media source may be implemented within a VOD system or interactive television system that allows users to select, receive, and view video content over a network. The media source also may comprise or form part of an IPTV system that delivers digital television content over an IP connection, such as a broadband connection. The embodiments are not limited in this context.

The SOC device 100 may be coupled to the media source through various types of communication channels capable of carrying information signals such as wired communication links, wireless communication links, or a combination of both, as desired for a given implementation. The SOC device 100 also may be arranged to receive media content from the media source through various types of components or interfaces. For example, the SOC device 100 may be arranged to receive media content through one or more tuners and/or interfaces such as an OpenCable (OC) tuner, NTSC/PAL tuner, tuner/demodulator, point-of-deployment (POD)/DVB common interface (DVB-CI), A/V decoder interface, Ethernet interface, PCI interface, and so forth.

The media content delivered to the SOC device 100 may comprise various types of information such as image information, audio information, video information, A/V information, and/or other data. In some implementations, the media source may be arranged to deliver media content in various formats for use by a device such as an STB, IPTV device, VOD device, media player, and so forth.

The media content may be delivered as compressed media content to allow the SOC device 100 to efficiently store and/or transfer data. In various implementations, the media content may be compressed by employing techniques such as spatial compression using discrete cosine transform (DCT), temporal compression, motion compensation, and quantization. Video compression of the media content may be performed, for example, in accordance with standards such as H.264, MPEG-2, MPEG-4, VC-1, and so forth.

The media content may be delivered as scrambled and/or encrypted media content to prevent unauthorized reception, copying, and/or viewing. In various embodiments, for example, the SOC device 100 may be arranged to receive scrambled and/or encrypted media content delivered from a conditional access (CA) system. In such embodiments, the CA system may be arranged to apply a scrambling algorithm to a media stream so that access is limited to only valid devices, such as an authorized STB. The scrambled media stream may comprise encrypted keys that may be used by an authorized STB to descramble the media stream and recover original content in the clear.

In various embodiments, the SOC device 100 may support encryption in accordance with the Advanced Encryption Standard (AES) (National Institute of Standards and Technology (NIST), Advanced Encryption Standard (AES), Federal Information Processing Standards (FIPS) Publication 197, Nov. 26, 2001). The SOC device 100 also may support Advanced Access Content System (AACS) encryption, Data Encryption Standard (DES) encryption, Triple DES (3DES) for key ladder generation, Rivest, Shamir, and Adleman (RSA) encryption, Elliptic curve cryptography (ECC) encryption, hard disk drive (HDD) encryption, DTCP-IP encryption, Cryptomeria Cipher (C2) encryption, Content Scramble System (CSS) encryption, and so forth.

As illustrated in FIG. 1, the SOC device 100 may comprise a plurality of functional units 102-1-N, where N may represent any positive integer value limited only by the physical capacity of the SOC device 100. The plurality of functional units 102-1-N may be implemented within the SOC device 100 on a single chip or integrated circuit (IC). The IC or PCB may include, for example, conductive traces, via structures, and/or one or more laminates fabricated by processes such as etching, bonding, drilling, and plating. In some embodiments, the PCB may comprise a flexible material, such as a flexible printed circuit (FPC).

In various embodiments, each of the plurality of functional units 102-1-N may comprise hardware and/or software for performing one or more operations for the SOC device 100. The functional units 102-1-N maybe implemented, for example, by various logic devices such as a central processing unit (CPU), microcontroller, microprocessor, general purpose processor, dedicated processor, chip multiprocessor (CMP), media processor, digital signal processor (DSP), network processor, co-processor, input/output (I/O) processor, application specific integrated circuit (ASIC), field programmable gate array (FPGA), programmable logic device (PLD), and so forth. In various implementations, one or more of the functional units 102-1-N may include one or more processing cores arranged to execute digital logic and/or provide for multiple threads of execution.

The functional units 102-1-N also may comprise memory implemented by one or more types of computer-readable storage media such as volatile or non-volatile memory, removable or non-removable memory, erasable or non-erasable memory, writeable or re-writeable memory, and so forth. In various embodiments, one or more of the functional units 102-1-N may include addressable memory locations in main memory, memory space, and/or registers implemented as random-access memory (RAM) and/or read-only memory (ROM), for example.

As shown in the embodiment of FIG. 1, the plurality of functional units 102-1-N may comprise a DRAM controller 102-1, a host CPU 102-2, an encoder/decoder (codec) 102-3, a peripherals interface (I/F) 102-4, a DSP 102-5, a transport demultiplexer (demux) 102-6, a display I/F 102-7, and a flash I/F 102-N. The embodiments are not limited in this context.

In this embodiment, the DRAM controller 102-1 may be arranged to control the storage and retrieval of data from an off-chip DRAM such as Synchronous Dynamic RAM (SDRAM), Double-Data-Rate RAM (DDR RAM), DDR SDRAM, and so forth.

In various implementations, data may be stored to and/or retrieved from the off-chip DRAM in connection with networking, multimedia, and/or communications applications performed by the SOC device 100. In some cases, the DRAM controller 102-1 may implement tamper-resistant code and other mechanisms to protect data when transferred to and from the off-chip DRAM.

The host CPU 102-2 may be arranged to perform various operations such as initialization (e.g., boot) and issuing commands to manage or control networking, multimedia, and/or communications applications for the SOC device 100. The host CPU 102-2 may be arranged, for example, to manage the manipulation of data (e.g., read, write, and erase) within the SOC device 100 to control such applications. In various embodiments, the host CPU 102-2 may comprise a microcontroller or other computing device arranged to execute logic implemented as software (e.g., operating system (OS) software, application software), code (e.g., boot code), and/or firmware.

The codec 102-3 may be arranged to perform various encoding, decoding, and/or transcoding operations on data within the SOC device 100. The codec 102-3 may comprise, for example, one or more audio and/or or video codecs (e.g., H.264, MPEG-2, MPEG-4, VC-1 codecs) for performing operations such as decompressing compressed media content prior to playback. In various implementations, the codecs may comprise encrypted code in DRAM and/or use a fixed mask ROM to prevent unauthorized code execution. For example, host-based soft codecs may address and ensure isolated execution.

The peripherals I/F 102-4 may be arranged to receive data delivered to the SOC device 100 from an off-chip media source. In various implementations, the peripherals I/F 102-4 may be arranged to receive media content delivered over an IP-based Ethernet or PCI connection.

The DSP 102-5 may be arranged to perform various signal processing operations on data within the SOC device 100. In various implementations, the DSP 102-5 may be arranged to perform audio signal processing, digital image processing and/or speech processing operations for networking, multimedia, and/or communications applications of the SOC device 100.

The transport demux 102-6 may be arranged to receive scrambled and/or encrypted media content delivered to the SOC device 100 and to descramble and/or decrypt the media content to recover the original content in the clear. In various implementations, the transport demux 102-6 may receive media content as a scrambled and/or encrypted transport stream through one or more tuners and/or interfaces. The transport demux 102-6 may be arranged to demultiplex a stream. For example, the incoming stream to the SOC device 100 may comprise many audio and video streams time-multiplexed into a single multi-program transport stream, and the transport demux 102-6 may be arranged to separate the multi-program transport stream into one or more stand alone streams (e.g., video stream, audio stream, data stream, etc.).

The display I/F 102-7 may be arranged to perform various processing operations on data within the SOC device 100 for rending, displaying, and/or playing media content on a screen or other user interface (UI). In various implementations, the display I/F 102-7 may comprise a graphics engine arranged to support 2D/3D graphics performance, multiple video textures, texture blending, and/or texture compression.

The flash I/F 102-N may be arranged to control the storage and retrieval of data from an off-chip flash memory such as NOR or NAND flash memory. In various implementations, data may be stored to and/or retrieved from the off-chip flash memory in connection with networking, multimedia, and/or communications applications performed by the SOC device 100.

As illustrated in the embodiment of FIG. 1, the functional units 102-1-N may be connected and/or logically coupled by a bus 104. In various embodiments, the bus 104 may be arranged to interconnect each of the functional units 102-1-N within the SOC device 100. The bus 104 may comprise conductive traces or lines for carrying signals such as address signals, data signals, and/or control signals. In various implementations, each of the functional units 102-1-N may be arranged to operate as a master of the shared on-chip bus 104 having the ability to read and write data to any other functional unit of the SOC device 100.

The bus 104 may be implemented, for example, as a Peripheral Component Interconnect (PCI) bus, PCI Extended (PCI-X) bus, PCI Express (PCIe) bus, XSI bus, CardBus, and so forth. Although the bus 104 may be illustrated and described as comprising a certain type and/or number of buses for ease of understanding, it may be appreciated that various bus architectures may be used for a given implementation. It also can be appreciated that, in some implementations, the functional units 102-1-N may be arranged to communicate with each other by data and descriptor passing over direct connections.

The plurality of functional units 102-1-N may comprise corresponding ports 106-1-N. Each of the ports 106-1-N may comprise, for example, an access point, bridge, and/or interface to the bus 104 for communicating data among the functional units 102-1-N of the SOC device 100. In various embodiments, each of the ports 106-1-N may comprise a shared access port arranged to provide an input path for receiving data in from one or more functional units over the shared on-chip bus 104 and an output path to send data out to one or more functional units over the shared on-chip bus 104.

As shown, the plurality of ports 106-1-N may be coupled to each other through the bus 104 by a plurality of datapaths 108-1-X, where X may represent any positive integer value. The datapaths 108-1-X may comprise, for example, logical or virtual connections between functional units 102-1-N of the SOC device 100. In some cases, a datapath may comprise a direct point-to-point connection between functional units. In other cases, a secure datapaths may comprise an indirect connection between functional units. Although a limited number of datapaths is shown by way of example, it can be appreciated the SOC device 100 may comprise any number of datapaths forming virtual connections between and/or among any of the functional units 102-1-N.

In the embodiment of FIG. 1, for example, the datapath 108-1 may comprise a point-to-point connection between the transport demux 102-6 and the codec 102-3. The datapath 108-2 may comprise a point-to-point connection between the transport demux 102-6 and the DRAM controller 102-1. The datapath 108-3 may comprise a point-to-point connection between the DRAM controller 102-1 and the codec 102-3. The datapath 108-X may comprise a point-to-point connection between the codec 102-3 and the display I/F 102-7. In some implementations, the datapath 108-2 and the datapath 108-3 may comprise an indirect connection between the transport demux 102-6 and the codec 102-3. The embodiments are not limited in this context.

In various embodiments, the datapaths 108-1-X may be defined by addresses associated with the functional units 102-1-N. For example, the datapath 108-1 may be defined by one or more addresses associated with the transport demux 102-6 and one or more addresses associated with the codec 102-3. In some embodiments, the datapath 108-1 may be defined by one or more addresses associated with the port 106-6 of the transport demux 102-6 and by one or more addresses associated with the port 106-3 of the codec 106-3. In other embodiments, the datapath 108-1 may be defined by an address or address range within the transport demux 102-6 and by an address or address range within the codec 102-3. In some cases, the address or address range may correspond to a particular processing device (e.g., CPU) and/or memory location (e.g., main memory, memory space, register) within the transport demux 102-6 and/or the codec 102-3. The embodiments are not limited in this context.

As illustrated in the embodiment of FIG. 1, the SOC device 100 may comprise a security controller 110. In various implementations, the security controller 110 may be incorporated and/or embedded into the SOC device 100 to provide security for the datapaths 108-1-X among the functional units 102-1-N. The security controller 110 may be implemented by hardware and/or software in the SOC device 100. The security controller 110 may comprise, for example, a logic device such as a CPU and/or executable logic. In various embodiments, the security controller 110 may comprise datapath security logic for protecting on-chip data within the SOC device 100.

The security controller 110 may be arranged to configure the functional units 102-1-N to provide secure datapaths, such as datapaths 108-1-X. For example, the security controller 100 may configure a security layer for the input side and output side of each of the ports 106-1-N of the functional units 102-1-N. In various embodiments, the security controller 110 may be arranged to establish datapath security logic at the ports 106-1-N of the functional units 102-1-N. The datapath security logic may comprise, for example, decryption and encryption logic (e.g., XOR or XNOR function) applied at the input and output of a datapath using on or more datapath security keys.

In various embodiments, the security controller 110 may be arranged to generate and manage datapath security keys 112 for providing secure datapaths among the functional units 102-1-N. Each of the datapath security keys 112 may be implemented as a cryptographic key such as a symmetric or asymmetric key comprising, for example, a random bit-sequence (e.g., 32-bits, 64-bits, 128-bits or 256-bits) for encrypting and/or decrypting data. In various implementations, the security controller 110 may be arranged to generate the datapath security keys 112 by employing a random number generator (RNG) to ensure sufficient entropy. The security controller 110 may be arranged to generate datapath security keys 112 using various encryption techniques such as RSA, ECC, DES, 3DES, AES, AACS, and so forth. The embodiments are not limited in this context.

The security controller 110 may be arranged, for example, to establish secure datapaths among the functional units 102-1-N using address-dependent datapath security keys 112. In some cases, the address-dependent datapath security keys 112 and/or the associated addresses may be fixed. In other cases, the address-dependent datapath keys 112 and/or the addresses may be changed dynamically. In some embodiments, for example, the datapath security keys 112 may comprise programmable key settings to support refreshing or establishing new datapath security keys at each reboot, for example. The embodiments are not limited in this context.

In some cases, common datapath security keys may be used between functional units connected by isolated secure datapaths. For example, a common datapath security key may be used for each of the functional units 102-1-N. In other embodiments, different datapath security keys may be used at the input port and output port of a secure datapath. In some cases, the datapath security keys 112 may comprise multiple input/output keys for a secure datapath. In various implementations, different datapath security keys may be used for embedded code (e.g., firmware) and for run time data so that owners of the code (e.g. media providers) may use customized keys.

In various embodiments, each of the functional units 102-1-N may comprise multiple addressable regions such as a port address, CPU address, main memory address, memory space address, register address, and so forth. In such embodiments, one or more datapath security keys 112 may be associated with each of the multiple addresses. The security controller 110 may be arranged to associate or map datapath security keys 112 to particular addresses or address regions of the functional units 102-1-N. In various implementations, the security controller 110 may employ memory management unit (MMU) like capability built into the address and data channels of the bus 104 (e.g., XSI bus) to perform such association or mapping functions. In some cases, each of the functional units 102-1-N may comprise multiple address ranges, with a datapath security key mapped to each address range.

In various embodiments, only the security controller 110 may be programmed with or comprise the capability to generate the datapath security keys 112 and write datapath security keys to the functional units 102-1-N. For example, the SOC device 100 may employ a particular protocol so that only the security controller 110 may generate the datapath security keys 112 and the use the bus 104 to write the datapath security keys to the functional units 102-1-N. In various implementations, each of the ports 106-1-N may comprise datapath security keys registers that are only accessible by reads and writes from the security controller 110 enabled using a dedicated secure read/write attribute sent on the bus 104. In such implementations, only the security controller 110 may generate traffic with the secure read/write attribute on the bus 104, and the functional units 102-1-N may decode the attribute as an alternate address space bit to program local key registers.

In various implementations, the security controller 110 may generate and write the datapath security keys 112 and datapath security logic in response to an initialization command (e.g., boot code) of the host CPU 102-2. For example, during secure boot or after reset of the SOC device 100, the security controller 110 may initialize and enable the datapath security keys and datapath security logic at each of the ports 106-1-N to configure secure datapaths for the SOC device 100. In some embodiments, the datapath security keys may be generated during a secure boot using an on-chip private key as a root of trust.

In various embodiments, the security controller 110 may implement a bypass mode to turn off the datapath security. For example, the security controller 110 may program a bypass value (e.g. all 0's or all 1's) to instruct the datapath security logic (e.g., XOR or XNOR function) to perform a bypass. In various implementations, at reset of the SOC device 100, the datapath security keys at the functional units 102-1-N may be set to a default or bypass value until enabled by the security controller 110.

In various embodiments, the datapath security keys 112 may comprise one or more unit input keys (UIKs) and/or one or more unit output keys. The security controller 110 may be arranged to establish secure datapaths by associating one or more UIKs and one or more UOKs with the functional units 102-1-N. In various implementations, a particular functional unit may comprise one or more UIKs associated with one or more addresses for receiving data in from the bus 104. The functional unit also may comprise one or more UOKs associated with one or more destination addresses for sending data out to the bus 104. In such implementations, one or more secure datapaths may be configured for each of the multiple addressable regions of the functional unit.

In various embodiments, data transferred over the shared on-chip bus 104 may be encrypted with a particular UOK, and only those functional units authorized to view the data in the clear are provided with the corresponding UIK for decrypting the data. In such embodiments, only those functional units having the proper UIK may be able to decrypt the data, and functional units without the corresponding UIK may read the data, but only in the encrypted format. Accordingly, encrypted data may be transferred securely over the shared on-chip bus 104 among the functional units 102-1-N by allowing only authorized functional units to view the data in the clear.

As shown in the embodiment of FIG. 1, for example, the security controller 110 may be arranged to establish UIKs 114-1-N and UOKs 116-1-N at the ports 106-1-N of the functional units 102-1-N. The UIKs 114-1-N may be arranged to decrypt data in to the ports 106-1-N from the bus 104. The UOKs 116-1-N may be arranged to encrypt data out from ports 106-1-N to the bus 104. In various implementations, one or more of the UIKs 114-1-N may form a datapath security key-pair with one or more of the UOKs 116-1-N to provide secure datapaths, such as datapaths 108-1-X. For example, a particular UOK (e.g., UOK 116-6) and a particular UIK (e.g., UIK 114-3) may comprise common datapath security keys for providing an isolated secure datapath (e.g., datapath 108-1).

Although the embodiment of FIG. 1 shows UIKs and UOKs configured at each functional unit and port for purposes of illustration, the embodiments are not limited in this context. For example, in some embodiments, one or more functional units (e.g., DRAM controller 102-1, CPU 102-2) may not be configured with UIKs and UOKs. Furthermore, it can be appreciated that each of the UIKs 114-1-N and UOKs 116-1-N may comprise one or more datapath security keys.

In various embodiments, each of the functional units 102-1-N may comprise one or more protected address regions to be associated with address-dependent datapath security keys. In some implementations, functional units that comprise embedded code RAM visible to the host CPU 102-2 may require a separate code region key register allocated to the code RAM address space. The code region key register may enable protection of code in DRAM for units with instruction caches or run time code swaps/updates. For functional units with a fixed code image, the code region key register may be changed after the code is loaded to prevent further reading or writing of the code.

In some embodiments, one or more of the functional units 102-1-N may comprise selectable address ranges for enabling unprotected regions not associated with address-dependent datapath security keys. In some cases, a functional unit may be configured with two or more unprotected regions with one unprotected region enabling clear access to the memory mapped configuration space of the particular functional unit for initialization and software driver interaction and another unprotected region enabling a clear content region when necessitated for Host CPU applications.

In various implementations, the host CPU commands may identify the input side and output side of each of the ports 106-1-N to be protected for enabling key sharing among the functional units 102-1-N. The host CPU commands also may include the ability to individually lock the datapath security keys 112 until a chip reset occurs to allow initialization software (e.g., boot code) to enable the secure datapaths while preventing other layers of software from modifying the initial settings.

In some embodiments, the security controller 110 may be arranged to dynamically configure secure datapaths on-the-fly. For example, the security controller 110 may be arranged to dynamically configure and/or modify the configuration of the secure datapaths during run time or when changing channels from a media content source, for example. In such embodiments, the prior datapath configurations may be torn down, and the prior datapath security keys are replaced with a new set of datapath security keys. The embodiments are not limited in this context.

In some embodiments, the security controller 110 may be arranged to enable and disable datapath security key access at each of the functional units 102-1-N. In such embodiments, the security controller 110 may be arranged to send one or more point-to-point signals to each of the functional units 102-1-N to enable security key register reading and writing. For example, writing to a security key register may be enabled by signal. In various implementations, a register read verify disables access and detects unauthorized reading or writing. In such implementations, reading a disabled register may return a value of all zeros. The security controller 110 may be arranged to perform a write/read verification routine after enablement followed by a read verify disabled. The embodiments are not limited in this context.

In some embodiments, the security controller 110 may be arranged to establish a dedicated key datapath. In such embodiments, datapath security keys in the security controller 110 may be used for a dedicated path to each of the functional units 102-1-N. For example, a key bus may be connected to each of the functional units 102-1-N for employing a key passing protocol. In some cases, address bits may be added for large or multiple key loads. The embodiments are not limited in this context.

For purposes of illustration, and not limitation, one exemplary embodiment will be described with reference to FIG. 1. In this embodiment, the transport demux 102-6 may contain descrambled and/or decrypted data from a transport stream stored as compressed clear media content. The transport demux 102-6 may be arranged to send encrypted data out to the codec 102-3 over a secure datapath 108-1. The datapath 108-1 may comprise a point-to-point connection configured to carry data out from the transport demux 102-6 and to carry data in to the codec 102-3. The destination of the datapath 108-1 may be defined, for example, by one or more addresses associated with the port 106-1 and/or the codec 102-3.

In this embodiment, the UOK 116-6 and the UIK 114-3 may be used to secure the datapath 108-1. For example, the UOK 116-6 and the UIK 114-3 may comprise a key-pair and/or common keys assigned or mapped to the particular address or address range associated with the codec 102-3. The UOK 116-6 may be used to encrypt data out through the datapath 108-1, and the UIK 114-3 may be used to decrypt data in through the datapath 108-1. The transport demux 102-6 may use the UOK 116-6 to encrypt compressed clear data and may send encrypted data out through the datapath 108-1 to the codec 102-3. Upon receiving the encrypted data from the transport demux 102-6, the codec 102-3 may use the UIK 114-3 to decrypt the encrypted data.

In some embodiments, the transport demux 102-6 may be arranged to send data to the DRAM controller 102-1 for queuing in an off-chip DRAM, for example, before the data is provided to the codec 102-3 for decompression. In such embodiments, the transport demux 102-6 may use the UOK 116-6 to encrypt compressed clear data and may send encrypted data out through a secure datapath 108-2 to the DRAM controller 102-1. Upon receiving the encrypted data from the transport demux 102-6, the DRAM controller 102-1 may pass the encrypted data as is to an off-chip external DRAM.

After retrieving the encrypted data from the external DRAM, the DRAM controller 102-1 maybe arranged to send encrypted data over a secure datapath 108-3 to the codec 102-3. The datapath 108-3 may carry data out from the DRAM controller 102-1 and carry data in to the codec 102-3. The destination of the datapath 108-3 may be defined, for example, by one or more addresses associated with the port 106-3 and/or the codec 102-3. Upon receiving the encrypted data from the DRAM controller 102-1, the codec 102-3 may use the UIK 114-3 to decrypt the encrypted data to recover the compressed clear media content.

In this example, the datapath 108-2 and the datapath 108-3 may comprise an indirect path between the transport demux 102-6 and the codec 102-3. The UOK 116-6 and the UIK 114-3 may comprise a common key or datapath security key-pair to be used for the indirect path. In this case, because the DRAM controller 102-1 receives encrypted data, the DRAM controller 102-1 does not need to be configured with UIK 114-1 and/or UOK 116-1. In other cases, the DRAM controller 102-1 may be arranged to perform decryption and encryption using the UIK 114-1 and the UOK 116-1. It can be appreciated that other external memories, such as flash memory, may be used in this way.

In this embodiment, the codec 102-3 may be arranged to perform one or more decoding operations such as decompressing the compressed media content to recover uncompressed media content in the clear. The codec 102-3 may be arranged to encrypt the uncompressed clear media content and to send encrypted data over a secure datapath 108-X to the display I/F 102-7. The datapath 108-X may comprise a point-to-point connection configured to carry data out from the codec 102-3 and to carry data in to the display I/F 102-7. The destination of the datapath 108-X may be defined, for example, by one or more addresses associated with the port 106-7 and/or the display I/F 102-7.

The UOK 116-3 and the UIK 114-7 may be used to secure the datapath 108-3. For example, the UOK 116-3 and the UIK 114-7 may comprise a key-pair and/or common keys assigned or mapped to the particular address or address range associated with the display I/F 102-7. The codec 102-3 may use the UOK 116-3 for encrypting the uncompressed clear media content and may send encrypted data out through the datapath 108-X to the display I/F 102-7. Upon receiving the encrypted data from the codec 102-3, the display I/F 102-7 may use the UIK 114-7 to decrypt the encrypted data to recover the uncompressed media content in the clear. The display I/F 102-7 may be arranged to perform additional processing in connection with displaying the media content.

It can be appreciated that in this example, the datapath 108-1 and the datapath 108-X may comprise an indirect path between the transport demux 102-6 and the display I/F 102-7.

As such, the UOK 116-6 and the UIK 114-7 may comprise a common key or datapath security key-pair to be used for the indirect path.

In this embodiment, when encrypted data is sent through a particular secure datapath (e.g., datapath 108-1) using a particular UOK (e.g., UOK 116-6), only those functional units (e.g., codec 102-3) authorized to view the data in the clear are provided with the corresponding UIK (e.g., UIK 114-3) for decrypting the data. As such, other functional units (e.g., host CPU 102-2, DSP 106-5) without the corresponding UIK may move the data and/or read the data, but only in the encrypted format. Accordingly, the encrypted data may be transferred securely over the shared on-chip bus 104 among the functional units 102-1-N and may be protected when stored off-chip such as in DRAM or flash memory.

In various implementations, the described embodiments may provide security for an SOC device 100 by encrypting and decrypting data in to and out of various embedded function units 102-1-N attached to each through shared access ports 106-1-N and/or an on-chip bus 104. Accordingly, the SOC device 100 may encrypt and protect content when transferred over secure data paths and may allow only authorized functional units to view content in the clear. In addition, the SOC device 100 may allow host CPU software (e.g., OS, applications) to manipulate data transfers without exposing the decrypted data to the software. The SOC device 100 also may employ address dependency and non-encrypted address ranges to enable transparent access to I/O and other non-protected functions and to keep command, control, and status regions of the on-chip functional units accessible to driver software.

In various implementations, the described embodiments may protected data when stored in an external memory such as DRAM or flash memory, as well as when read in to the SOC device 100 from an external memory. The described embodiments may provide protection or encryption of data (e.g., premium media content, firmware) in external memory (e.g., DRAM, flash memory) without impacting the timing, functioning, and/or programming of the external memory interfaces. The described embodiments may allow embedded CPU code to exist encrypted in DRAM and/or flash memory thus extending the available code space (e.g., swap images, etc.) for embedded CPUs and to be decrypted when read into the protected execution space of local embedded processors. As such embedded CPUs may operate with instruction caches to maintain off-chip code encrypted without adding additional cycles to the fetch.

Although some embodiments may involve protecting media content over secure datapaths within a SOC device 100, it can be appreciated that embodiments may be used to protect various types of compressed or uncompressed content or information. In various embodiments, for example, the content or information may be associated with one or more images, image files, image groups, pictures, digital photographs, music file, sound files, voice information, videos, video clips, video files, video sequences, video feeds, video streams, movies, broadcast programming, television signals, web pages, user interfaces, graphics, textual information (e.g., encryption keys, serial numbers, e-mail messages, text messages, instant messages, contact lists, telephone numbers, task lists, calendar entries, hyperlinks), numerical information, alphanumeric information, character symbols, and so forth. The content or information also may include command information, control information, routing information, processing information, system file information, system library information, software (e.g., OS software, file system software, application software, game software), firmware, an application programming interface (API), a program, an applet, a subroutine, an instruction set, an instruction, computing code, logic, words, values, symbols, and so forth.

Figure 2:
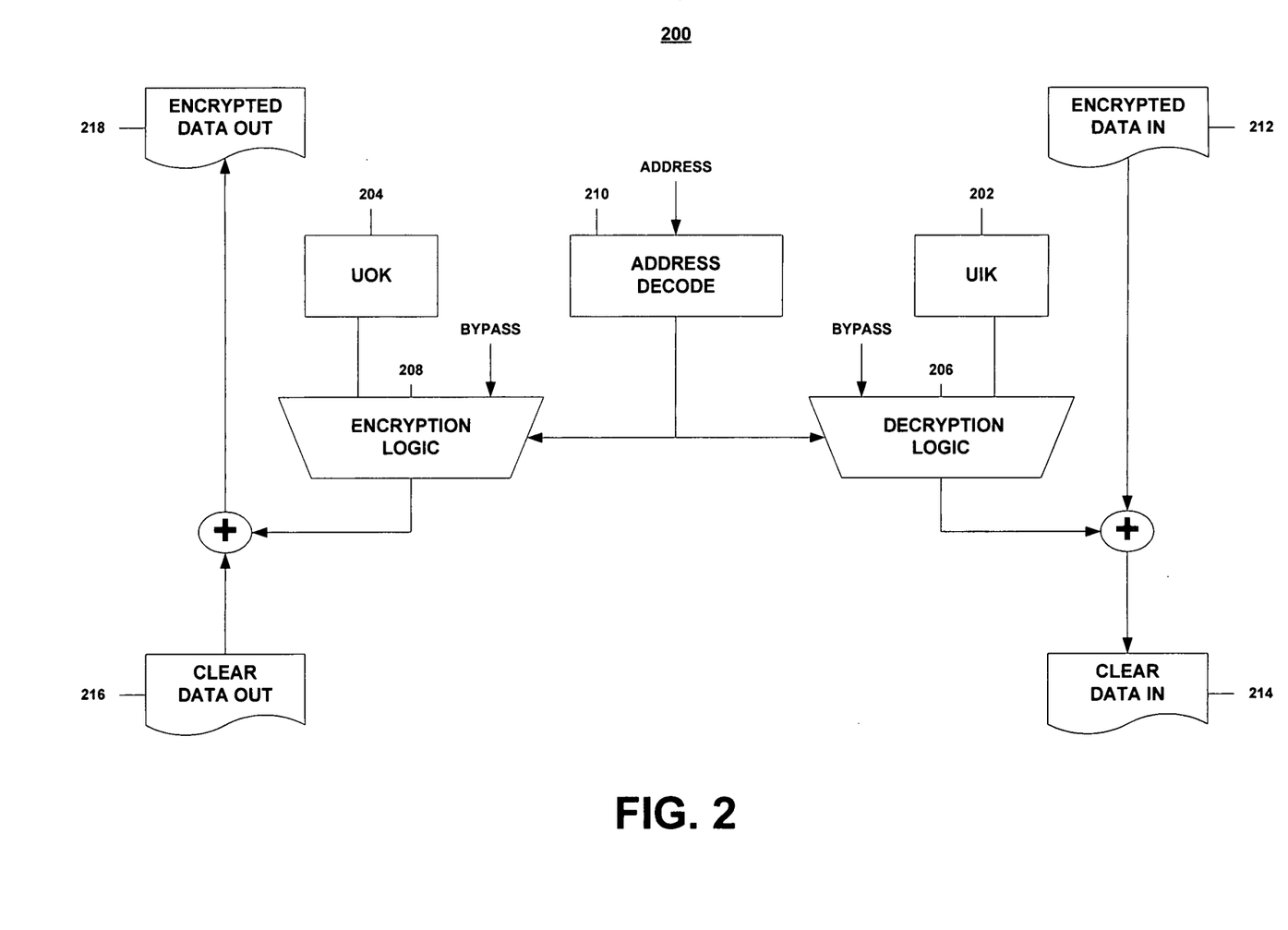
FIG. 2 illustrates one embodiment of a datapath security system.

FIG. 2 illustrates one embodiment of a datapath security system 200. The datapath security system 200 may be implemented, for example, by one or more elements of the SOC device 100 illustrated in FIG. 1. In various embodiments, the datapath security system 200 may be implemented by one or more devices, units, and/or components and may comprise hardware, software, and/or any combination thereof, as desired for a given set of design parameters or performance constraints. For example, the datapath security system 200 may be implemented by one or more logic devices and/or logic comprising instructions, data, and/or code to be executed by a logic device. The embodiments are not limited in this context.

As shown in FIG. 2, the datapath security system 200 may be configured with one or more datapath security keys comprising, for example, a UIK 202 and a UOK 204. In various embodiments, the UIK 202 may be used to decrypt data in to a shared access port and/or from an on-chip bus. The UOK 204 may be used to encrypt data out from a shared access port and/or through an on-chip bus.

The datapath security system 200 also may be configured with datapath security logic comprising, for example, decryption logic 206 and encryption logic 208. In various embodiments, the decryption logic 206 may comprise an XOR function, a XNOR function, and/or other decision logic arranged to use a datapath security key (e.g., UIK 202) at the input side of a shared access port and/or on-chip bus. The encryption logic 208 may comprise an XOR function, a XNOR function, and/or other decision logic arranged to use a datapath security key (e.g., UOK 204) at the output side of a shared access port and/or on-chip bus. The embodiments are not limited in this context.

As shown, the datapath security system 200 may implement a bypass mode to turn off datapath security. For example, a bypass value (e.g. all 0's or all 1's) may be input to the decryption logic 206 and/or to the encryption logic 208 to instruct the datapath security logic (e.g., XOR or XNOR function) to perform a bypass.

The datapath security system 200 may comprise an address decode module 210 implemented, for example, with MMU-like capability to perform address association or mapping functions. In various embodiments, the address decode module 210 may be arranged to associate or map datapath security keys (e.g., UIK 202, UOK 204) to particular addresses or address regions. In various implementations, the datapath security system 200 may be implemented by an SOC device comprising multiple addressable regions such as functional unit addresses, port addresses, CPU addresses, main memory addresses, memory space addresses, register addresses, and so forth. In such implementations, one or more datapath security keys (e.g., UIKs, UOKs) may be associated with one or more addresses or address ranges.

In various implementations, the datapath security system 200 may be arranged to receive encrypted data in 212 that has been encrypted with a particular UOK and is associated with a particular address or address range. The encrypted data in 212 may be received at a shared access port and/or from an on-chip bus, for example. Upon receiving the encrypted data in 212 and assuming no bypass, the datapath security system 200 may map the particular address with the UIK 202 and employ the decryption logic 206. If authorized and provided with the proper datapath security key, the datapath security system 200 may use the UIK 202 to decrypt the encrypted data in 212 and recover clear data in 214. If unauthorized or if there is a bypass, the encrypted data in 212 will remain encrypted.

In various implementations, the datapath security system 200 may be arranged to send clear data out 216 after encrypting with the UOK 204. Assuming no bypass, the datapath security system 200 may map the particular address with the UOK 204 and employ the encryption logic 208. The datapath security system 200 may use the UOK 204 to encrypt the clear data out 216 and send encrypted data out 218. The encrypted data out 218 may be sent from a shared access port and/or over on-chip bus, for example. If there is a bypass, the clear data out 216 will remain in the clear.

Figure 3:
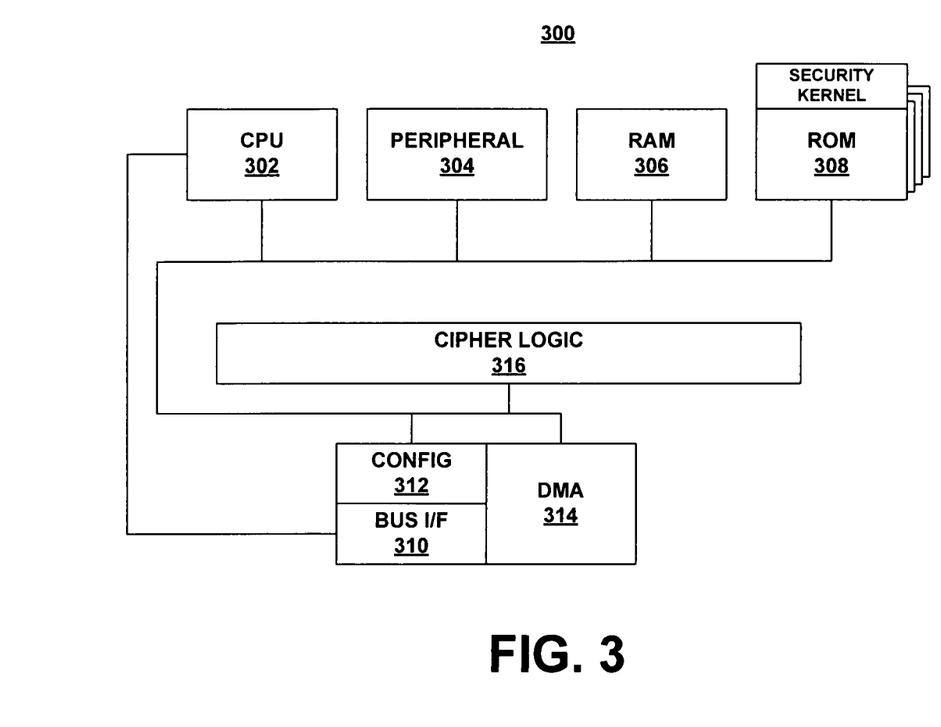
FIG. 3 illustrates one embodiment of a security controller.

FIG. 3 illustrates one embodiment of a security controller 300. The security controller 300 may be implemented, for example, by one or more elements of the SOC device 100 illustrated in FIG. 1. In various embodiments, the security controller 300 may be implemented by various devices, units, and/or components and may comprise hardware, software, and/or any combination thereof, as desired for a given set of design parameters or performance constraints. For example, the security controller 300 may be implemented by a one or more logic devices and/or logic comprising instructions, data, and/or code to be executed by a logic device. The embodiments are not limited in this context.

As shown in FIG. 3, the security controller 300 may comprise a CPU 302 implemented, for example, by a microprocessor such as a reduced instruction set computer (RISC) microprocessor. In various embodiments, the CPU 302 may support kernel and user address space/modes of execution. The CPU 302 may provide a reset vector in CPU ROM space. In various implementations, resets and tampering will cause CPU reset, and resets return the CPU 302 to kernel mode.

The security controller 300 may comprise a peripheral module 304 to provide support for common peripherals. The peripheral module 304 may comprise interrupt registers for kernel interrupts and/or for user interrupts. In various embodiments, the peripheral module 304 may comprise a common timer (e.g., 1-100 uS granularity) and a Watch Dog Timer (WDT). The WDT may be arranged to cause chip and security core reset. The WDT may cause a switch to kernel mode and kernel code execution with destruction of RAM contents and with clearing/initialization of cryptography engines. The WDT also may be arranged to cause user interrupt and/or one-time programmable (OTP) configuration bit selection.

The security controller 300 may comprise RAM 306 to store local variables and/or user code. In various embodiments, the user code may be authenticated and/or un-modifiable and may not access kernel address space. In some cases, the RAM 306 may be used to store kernel code for faster execution.

The security controller 300 may comprise ROM 308. The ROM 308 may be used to store secure boot code, reset vector, and/or original equipment manufacturer (OEM) specific code, for example. In various embodiments, the ROM 308 may comprise a storage area to store an OEM-specific security kernel. The ROM 308 may be arranged to support multiple vendor ROM/code requirements, such as multiple stock keeping unit (SKU)/ROM images. The ROM 308 may contain OTP memory space used for SKU-based program and upgradeable code, for example. The ROM 308 may provide OTP electrically erasable programmable ROM (EEPROM) capability on a chip for fuse or anti-fuse technology. Such capability may support ROM code requirements and reduce die size associated with key space. The ROM 308 may be arranged to support security kernel development, proprietary vendor code requirements, and various protocols associated with one or more CAs.

The security controller 300 may comprise bus logic implemented, for example, by a bus I/F 310 and configuration logic 312. The bus I/F 310 may be implemented as an inter-processor interface to prevent direct access to the CPU 302 or CPU code space from outside of the security core. For example, debug port access to the CPU 302 may be disabled. The configuration logic 312 may comprise a command set including a common command block with commands that support bulk decryption, key generation, authentication, number used once (nonce), signatures, user code load and execute, flash update, and so forth.

The security controller 300 may comprise a direct memory access (DMA) module 314 to support memory accesses to and from system memory for bulk ciphers, memory scrubs, and so forth. In various embodiments, the DMA module 314 may be arranged to provide hash type functions for system memory to security controller access and may be arranged to pass messages for security controller to system memory access. Security controller to security controller access may be performed over a dedicated channel not shared with the host. The DMA module 314 may include a multiple channel linked list. The DMA module 314 may provide semaphore control on channels to allow host or security core CPU control of the DMA module 314. For example, a semaphore may be managed by a security kernel.

The security controller 300 may comprise cipher logic 316 to support various types of ciphers and/or encryption such as 3DES encryption, AES encryption, AACS encryption, and so forth. The cipher logic 316 may be implemented, for example, as cryptography engines to support key ladder options, key provisioning (e.g., manufacture key ladder/non-manufacturer key ladder selection), and bulk cryptography (e.g., HDD, DTCP-IP etc.). The cipher logic 316 also may comprise an exponentiation unit (EAU) to support large number arithmetic operations and/or updatable security. The EAU may be arranged to perform various acceleration operations to off-load hardware execution to meet maximum execution time requirements for sign/verify operations and/or may provide indirect key loading from OTP memory.

Although the embodiments may be described as supporting certain types of encryption techniques for purposes of illustration, it can be appreciated that the embodiments are not limited in this context and may support various other encryption techniques. Furthermore, in some implementations, the security controller 300 may be arranged to provide reconfigurable and/or upgradeable security measure. For example, the security controller 300 may provide support for ciphers and/or encryption techniques that are not supported by hardware implementation using software (e.g., programmable state machine) control of ciphers and/or encryption to support a variety of vendor security protocols and customer encrypted off-chip code.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 4:
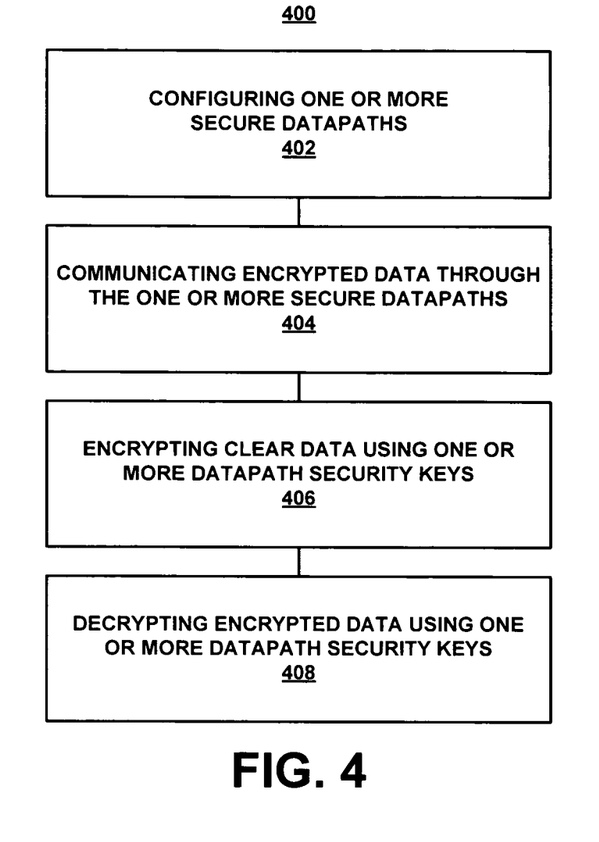
FIG. 4 illustrates one embodiment of a logic flow for datapath security.

FIG. 4 illustrates one embodiment of a logic flow 400 for datapath security. The logic flow 400 may be implemented, for example, by one or more elements of the SOC device 100 illustrated in FIG. 1. In various embodiments, the logic flow 400 may be performed by various systems, devices, units, and/or components and may be implemented as hardware, software, and/or any combination thereof, as desired for a given set of design parameters or performance constraints. For example, the logic flow 400 may be implemented by one or more logic devices (e.g., SOC device, functional unit, security controller) and/or logic (e.g., datapath security logic) comprising instructions, data, and/or code to be executed by a logic device. For purposes of illustration, and not limitation, the logic flow 400 is described with reference to FIG. 1. The embodiments are not limited in this context.

The logic flow 400 may comprise configuring one or more secure datapaths between functional units connected to a shared on-chip bus embedded in a SOC device (block 402). Referring to FIG. 1, for example, in various embodiments, one or more functional units 102-1-N of an SOC device 100 may be configured with one or more datapath security keys such as UIKs 114-1-N and a UOKs 116-1-N. In various embodiments, the UIKs 114-1-N may be used to decrypt data in from shared access ports 106-1-N and/or from an on-chip bus 104. The UOKs 116-1-N may be used to encrypt data out from shared access ports 106-1-N and/or through an on-chip bus 104.

In various implementations, the datapath security keys (e.g., UIKs 114-1-N, UOKs 116-1-N may be associated or mapped to particular addresses or address regions. For example, the SOC device 100 may comprise multiple addressable regions such as functional unit addresses, port addresses, CPU addresses, main memory addresses, memory space addresses, register addresses, and so forth. As such, one or more datapath security keys (e.g., UIKs, UOKs) may be associated with one or more addresses or address ranges.

In various embodiments, one or more functional units 102-1-N may be configured with decryption logic and/or encryption logic. In various implementations, the decryption logic and/or the encryption logic may comprise an XOR function, a XNOR function, and/or other decision logic arranged to use the datapath security keys (e.g., UIKs, UOKs) for decryption and/or encryption.

The logic flow 400 may comprise communicating encrypted data through the one or more secure datapaths (block 404). In various embodiments, the SOC device 100 may be arranged to encrypt and protect content when transferred over secure data paths and may allow only authorized functional units to view content in the clear. In some cases, a secure datapath may comprise an indirect path between functional units configured to use a common key or datapath security key-pair for the indirect path.

The SOC device 100 may allow host CPU software (e.g., OS, applications) to manipulate data transfers without exposing the decrypted data to the software. The SOC device 100 also may employ address dependency and non-encrypted address ranges to enable transparent access to I/O and other non-protected functions and to keep command, control, and status regions of the on-chip functional units accessible to driver software.

The logic flow 400 may comprise encrypting clear data using one or more datapath security keys (block 406). In various embodiments, one or more of the functional units 102-1-N may be arranged to encrypt clear data with UOKs 116-1-N. Assuming no bypass, a functional unit may map particular addresses and/or address regions with one or more UOKs and employ encryption. In various implementations, encrypted data may be sent out from shared access ports 106-1-N and/or over an on-chip bus 104, for example. If there is a bypass, clear data will remain in the clear.

The logic flow 400 may comprise decrypting encrypted data using one or more datapath security keys (block 408). In various embodiments, one or more functional units 102-1-N may be arranged to receive encrypted data in through shared access ports 106-1-N and/or over an on-chip bus 104, for example. The encrypted data may be encrypted with one or more datapath security keys (e.g., UOKs) and may be associated with particular addresses or address ranges. Upon receiving the encrypted data, and assuming no bypass, a functional unit may map the particular addresses or address regions with one or more UIKs and employ decryption. If authorized and provided with the proper datapath security key, the functional unit may decrypt the encrypted data in and recover clear data. If unauthorized or if there is a bypass, the encrypted data will remain encrypted.

In some embodiments, encrypted data received through the one or more secure datapaths may be sent to an off-chip memory. In such embodiments, the encrypted data will be protected when stored in an external memory such as DRAM or flash memory, as well as when read in to the SOC device 100 from an external memory.

Figure 5:
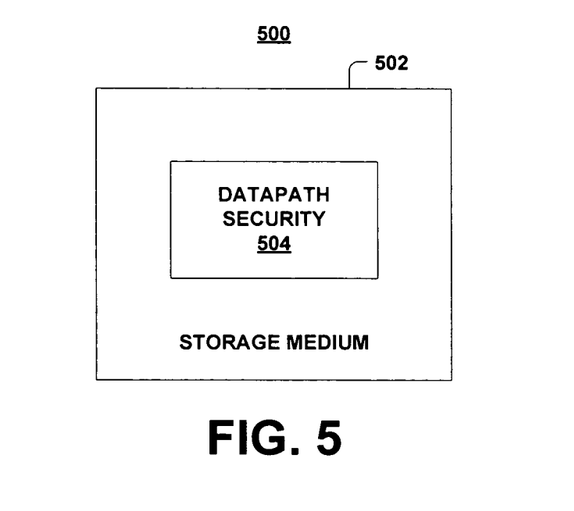
FIG. 5 illustrates one embodiment of an article of manufacture comprising datapath security logic.

FIG. 5 illustrates one embodiment of an article of manufacture 500. As shown, the article 500 may comprise a storage medium 502 to store datapath security logic 504 for performing various operations in accordance with the described embodiments. In various embodiments, the article 500 may be implemented by various systems, components, and/or modules.

The article 500 and/or machine-readable storage medium 502 may include one or more types of computer-readable storage media capable of storing data, including volatile memory or, non-volatile memory, removable or non-removable memory, erasable or non-erasable memory, writeable or re-writeable memory, and so forth. Examples of a machine-readable storage medium may include, without limitation, RAM, DRAM, DRAM, SDRAM, static RAM (SRAM), ROM, programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information.

The article 500 and/or machine-readable storage medium 502 may store datapath security logic 504 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The datapath security logic 504 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise; it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a system-on-a-chip device comprising:
a shared embedded on-chip bus;
one or more functional units connected to said shared embedded on-chip bus; and
a security controller to configure authorized ones of the one or more functional units to define one or more secure datapaths on the on-chip bus extending among the authorized ones of the one or more of the functional units, and to communicate among the authorized ones of said one or more functional units through the one or more secure datapaths by:
encrypting clear data to create encrypted data at one of the authorized functional units, sending the encrypted data out from the one of the authorized functional units through a secure datapath of the one or more secure datapaths defined on the on-chip bus, receiving the encrypted data in from a secure datapath of the one or more secure datapaths defined on the on-chip bus at another of the authorized functional units, and decrypting the encrypted data at the other of the authorized functional units to recover the clear data.

2. The apparatus of claim 1, wherein only the security controller can configure the one or more secure datapaths.

3. The apparatus of claim 1, the security controller to establish one or more datapath security keys at the one or more functional units.

4. The apparatus of claim 3, wherein the one or more datapath security keys may be changed dynamically.

5. The apparatus of claim 3, the security controller comprising memory management capability to map address-dependent datapath security keys with at least one address or address range of a functional unit to receive encrypted data.

6. The apparatus of claim 3, the one or more datapath security keys to enable authorized functional units to view clear data.

7. The apparatus of claim 6, wherein functional units that are not authorized to view clear data may manipulate encrypted data within the device.

8. The apparatus of claim 3, the one or more datapath security keys to enable encryption of clear data.

9. The apparatus of claim 1, the security controller to establish datapath security logic at the one or more functional units for encrypting clear data and decrypting encrypted data.

10. The apparatus of claim 1, wherein one or more of the functional units is connected to an off-chip memory to store encrypted data.

11. A system comprising:
an antenna to receive media content; and
a system-on-a-chip (SOC) device to process the media content, the SOC device comprising:
one or more functional units connected to a shared on-chip bus and a security controller configured to communicate media content encrypted to transfer among only authorized functional units of the one or more functional units through one or more secure datapaths defined on the on-chip bus and extending among the authorized functional units, the security controller operative to establish a plurality of datapath security keys comprising a first datapath security key at an input port of at least one of the one or more secure datapaths to encrypt the media content and a second datapath security key at an output port of the at least one secure datapath to decrypt the media content.

12. The system of claim 11, one or more of the functional units comprising datapath security logic for encrypting clear media content and decrypting encrypted media content.

13. The system of claim 11, wherein one or more of the functional units is connected to an off-chip memory to store encrypted media content.

14. A method comprising:
configuring one or more secure datapaths to enable communication between functional units of a system-on-a-chip device connected to a shared on-chip bus embedded in the system-on-a-chip device by encrypting clear data at one of the functional units to create encrypted data to transfer among only authorized functional units of the functional units of the system-on-a-chip device via the one or more secure datapaths defined on the shared on-chip bus and extending among the authorized functional units;
communicating the encrypted data through the one or more secure datapaths; and
decrypting the encrypted data at another one of the functional units.

15. The method of claim 14, further comprising configuring the authorized functional units of the one or more functional units with one or more datapath security keys.

16. The method of claim 14, further comprising encrypting the clear data to create the encrypted data using one or more datapath security keys at one of the authorized functional units.

17. The method of claim 16, further comprising decrypting the encrypted data at another one of the authorized functional units using one or more datapath security keys.

18. The method of claim 16, further comprising sending the encrypted data received by another of the authorized functional units through the one or more secure datapaths to an off-chip memory.

19. An article comprising a machine-readable storage medium containing instructions that if executed enable a system to:

configure one or more secure datapaths to enable communications between functional units of a system-on-a-chip device of the system connected to a shared on-chip bus embedded in the system-on-a-chip device by encrypting clear data at one of the functional units to create encrypted data to transfer among only authorized functional units of the functional units of the system-on-a-chip device via the one or more secure datapaths defined on the shared on-chip bus and extending among the authorized functional units;

communicate the encrypted data through the one or more secure datapaths; and decrypt the encrypted data at another one of the functional units.

20. The article of claim 19, further comprising instructions that if executed enable the system to configure the authorized functional units of the one or more functional units with one or more datapath security keys.

21. The article of claim 19, further comprising instructions that if executed enable the system to encrypt the clear data to create the encrypted data using one or more datapath security keys at one of the authorized functional units.

22. The article of claim 21, further comprising instructions that if executed enable the system to decrypt the encrypted data at another one of the authorized functional units using one or more datapath security keys.

23. The article of claim 21, further comprising instructions that if executed enable the system to send the encrypted data received by another of the authorized functional units through the one or more secure datapaths to an off-chip memory.

* * * * *